Figure 1:
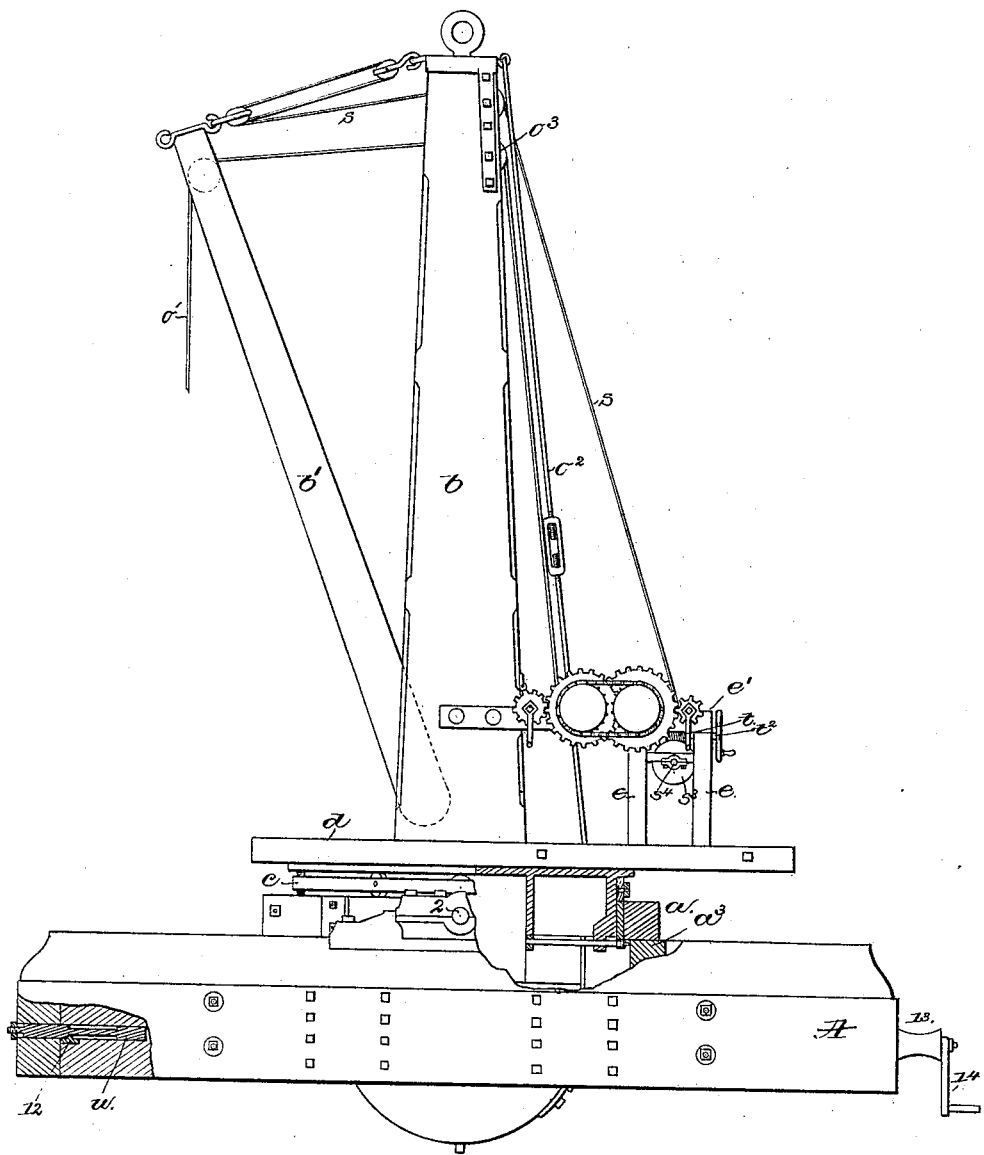

(No Model.) 2 Sheets—Sheet 1.

L. K. JEWETT.
WRECKING AND CONSTRUCTION CAR FOR RAILWAYS.

No. 269,527. Patented Dec. 26, 1882.

(No Model.) 2 Sheets—Sheet 2.
L. K. JEWETT.
WRECKING AND CONSTRUCTION CAR FOR RAILWAYS.
No. 269,527. Patented Dec. 26, 1882.
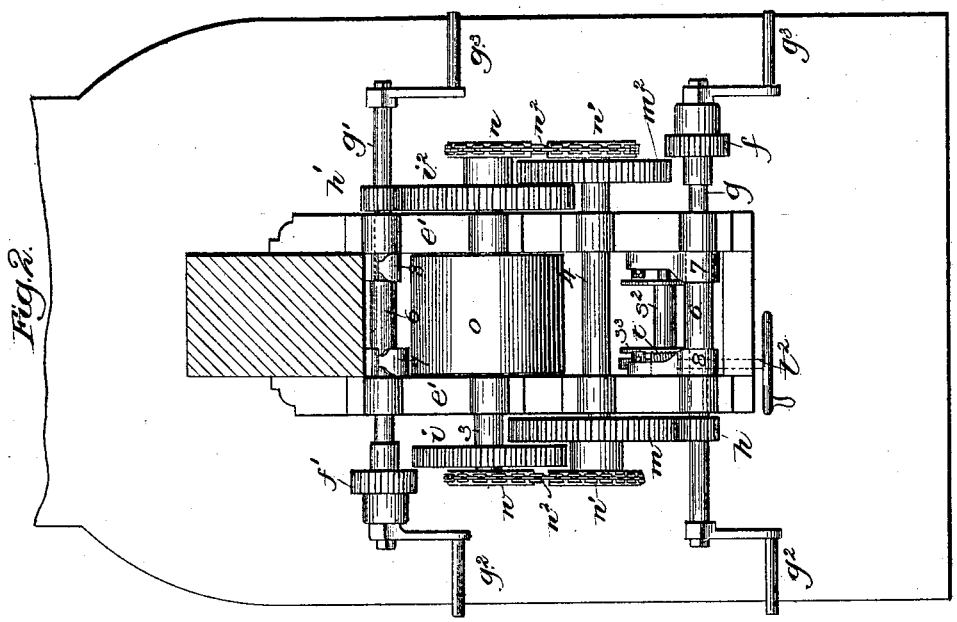
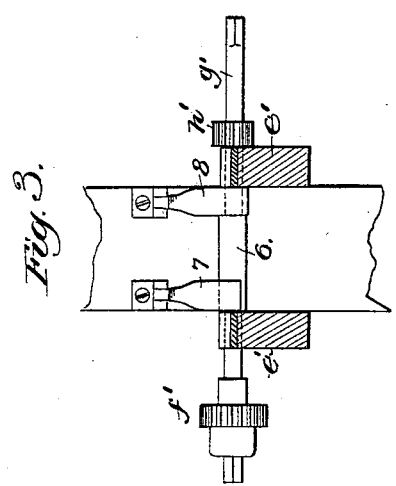
Witnesses.
John F. C. Prim...
Fred A. Powell.
Inventor:
Luther K. Jewett
by Crosby & Gregory attys.

UNITED STATES PATENT OFFICE.

LUTHER K. JEWETT, OF FITCHBURG, MASSACHUSETTS.

WRECKING AND CONSTRUCTION CAR FOR RAILWAYS.

SPECIFICATION forming part of Letters Patent No. 269,527, dated December 26, 1882.

Application filed October 19, 1882. (No model.)

*To all whom it may concern:*

Be it known that I, LUTHER K. JEWETT, of Fitchburg, county of Worcester, State of Massachusetts, have invented an Improvement in Wrecking and Construction Cars for Railways, of which the following description, in connection with the accompanying drawings, is a specification.

This invention is an improvement on United States Patent No. 252,672, granted to me January 24, 1882, to which reference may be had.

One part of my present invention relates more especially to the power mechanism for operating the boom and raising the load; also, to the combination, with the body of the wrecking-car, of one or more windlasses at one or both ends.

Figure 1 represents in side elevation a sufficient portion of a wrecking-car to illustrate my present invention; Fig. 2, an enlarged view, in plan, of the power mechanism; Fig. 3, a detail of one of the power-shafts, its collar, and locking devices.

The car-body A, the ring $a$, its journals 2, the wheeled ring $c$, the ring-timbers $a^3$, turn-table $d$, mast $b$, and boom $b'$ are as in my said patent.

On the turn-table $d$, I have mounted suitable uprights, $e$, and cross-beams $e'$, to constitute a frame-work to hold the shafts of the power mechanism, to be described.

I have arranged the power mechanism to be moved at slow speed by gears $h\ h'$, as shown in Fig. 2, on the shafts $g\ g'$, each having two cranks, $g^2\ g^3$. The gear $h$ meshes with an intermediate gear, $m$, on a shaft, 4, having at each end of it a sprocket or chain wheel, $n'$, connected by chain $n^2$ with a like sprocket or chain wheel, $n$, at opposite ends of the drum-shaft 3, the latter having upon it the drum $o$, which receives the chain or rope $o^2$, which, passed over a sheave, $o^3$, of the mast $b$ and a sheave in the boom $b'$, is to be connected with the car-body or other thing to be raised. The greatest power will be exerted when the gears $h\ h'$ are operative. Should the weight to be raised be light and greater speed of operation be needed, the shafts $g\ g'$ will be moved longitudinally in their bearings far enough to cause the gear $f f'$ thereon to engage the gears $m^2$ and $i$ and remove the gears $h\ h'$ from the gears $m$ and $i^2$. With the gears $f f'$ operative, the gear $f'$ will directly actuate the drum-shaft 3, and the gear $f$ will also assist in actuating it through the gear $m^2$ and sprocket or chain wheels $n\ n'$ and chain $n^2$ at the right of Fig. 2.

The shafts $g\ g'$ are each provided between the beams $e\ e'$ with a collar, 6, and each beam, at its inner sides, is provided with shaft-locking devices, (shown as pawls 7 8.) When the pawls 8 engage the ends of the collars 6, as in Fig. 2, the shafts $g\ g'$ will be held so as to cause the gears $h\ h'$ to be operative, at which time the pawls 7 will rest upon the collars 6; but as soon as the pawls 8 are lifted the shafts $g\ g'$ may be moved longitudinally far enough to permit the pawls 7 to drop at the opposite ends of the collars 6, when the shafts $g\ g'$ will be locked in such position as to enable the gears $f\ f'$ to be operative. The boom $b'$ is worked by the rope $s$, connected with the drum $s^2$, having upon its axle $s^4$ a worm-gear, $s^3$, which is engaged and turned by a worm, $t$, on a shaft, $t'$, having a crank or wheel, by which it may be turned by hand when it is desired to move the boom.

At each end of the car-body I have placed short strong shafts $u$, reduced in diameter, as shown at the left of Fig. 1, where the car-body is broken out and one of the said shafts is shown in section. These reduced portions of the shaft receive a stop, 12, which permits the said shaft to be moved longitudinally, preventing it, however, from being drawn out too far.

The shaft $u$, at the left of Fig. 1, is shown as pushed into the car-body; but when drawn out the said shaft may have applied to it a drum, 13, as at the right of Fig. 1, the said drum being so connected with the said shaft as to rotate with it when the latter is rotated by the crank or handle 14 applied to it, the inner end of the drum resting against the car-body. These drums or windlasses, so applied to the ends of the car-body, may have ropes fastened to them, and by connecting the said ropes with any movable article or thing at the sides of the track the said articles or things may be drawn to the car-body.

I claim—

1. The car-body, and turn-table, and mast, and boom, combined with the drum-shaft, its gears $i\ i^2$, shaft 4, its gears $m\ m^2$, the sprocket or chain wheels $n\ n'$ and chain $n^2$, and shafts $g\ g'$, provided with gears to operate the shafts 3 and 4, substantially as described.

2. The two shafts $g\ g'$ and their double set of gear $h\ h'\ f\ f'$, of different sizes, combined with the shafts 3 and 4 and their connected gearing $i\ i^2\ m\ m^2$, and sprocket or chain wheels and chain, whereby either the gears $h\ h'$ or $f\ f'$ may be made operative to turn the drum-shaft 3 at a slow or at a faster speed, substantially as described.

3. The car-body, turn-table, mast, and boom, combined with the drum $s^2$, rope or chain $s$, and means to turn the said drum, substantially as described.

4. The longitudinally-movable shaft $g$ and its collar 6 and gears of different diameter, combined with the two locking devices 7 8, to operate substantially as described.

5. The car-body, combined with the shafts $u$ and drums 13, to operate substantially as described.

6. The longitudinally-movable shaft $u$ and the car-body to which it is applied, combined with the drums 13 and crank 14, substantially as and for the purpose set forth.

In testimony whereof I have signed my name to this specification in the presence of two subscribing witnesses.

LUTHER K. JEWETT.

Witnesses:
G. W. GREGORY,
FRED A. POWELL.